United States Patent [19]

Okamoto et al.

[11] Patent Number: 5,228,313
[45] Date of Patent: Jul. 20, 1993

[54] LOW-TEMPERATURE STORAGE CASE

[75] Inventors: Shigemi Okamoto, Gunma; Tokutarou Mase, Tochigi, both of Japan

[73] Assignee: Sanyo Electric Co., Ltd., Osaka, Japan

[21] Appl. No.: 580,943

[22] Filed: Sep. 11, 1990

[30] Foreign Application Priority Data

Sep. 14, 1989 [JP] Japan .................................. 1-238587

[51] Int. Cl.$^5$ ............................................ F25D 17/04
[52] U.S. Cl. ............................................ 62/407; 62/78; 62/440
[58] Field of Search ............................ 62/78, 407, 440

[56] References Cited

U.S. PATENT DOCUMENTS 2,949,751  8/1960  Henrikson ............................. 62/239
4,845,958  7/1989  Senda et al. .......................... 62/94

FOREIGN PATENT DOCUMENTS 60-93882   6/1985  Japan .
62-134477  6/1987  Japan .

Primary Examiner—Ronald C. Capossela
Attorney, Agent, or Firm—Darby & Darby

[57] ABSTRACT

A low-temperature storage case having; a food storage room inside a thermally good conductive inner box which is surrounded by a thermally insulating outer box, and a cold-air circulation space between the two boxes; and a refrigeration unit disposed in the cold-air circulation space. Ethylene adsorbing members are provided on at least a portion of the inner box with one surface of each ethylene adsorbing member is exposed to the storage room and other surfaces exposed to the cold-air circulation space so as to adsorb ethylene gas in the storage room. In order to re-activate the ethylene adsorptibity of the adsorbing members, ther are provided; ventilation holes in the outer box; a heater disposed in the cold-air circulation space; and a ventilation unit mounted on the outer box for ventilating the cold-air circulation space as required.

6 Claims, 8 Drawing Sheets

LOW-TEMPERATURE STORAGE CASE

FIELD OF THE INVENTION

The invention relates to a low-temperature storage case utilizing indirect refrigeration of the storage room.

BACKGROUND OF THE INVENTION

There has been known a double walled low-temperature storage case having a thermally good conductive inner box and a thermally insulating outer box and having a refrigeration unit between the boxes for refrigerating the inner box and the room inside the inner box, as disclosed in Japanese Utility Model Early Publication No. Sho 60-93882 (which will be referred to as Reference 1). A refrigerator utilizing indirect refrigeration for preserving fresh vegetables is also known, as disclosed in Japanese Patent Early Publication No. Sho 62-134477 (which will be referred to as Reference 2).

Reference 1 shows a low-temperature case wherein a thermally good conductive inner box is secured inside, but spaced apart from, a thermally insulating outer box, forming a space between them for circulating cold air therethrough to refrigerate the inner box, and thus the storage room inside the inner box. The low-temperature case is provided with an evaporator of a refrigeration unit for generating cold air and a fan for circulating the cold air through the apace. Other components of the refrigeration unit are installed outside the low-temperature case.

On the other hand, the refrigerator of the Reference 2 discloses a vegetable preservation container wherein the upper opening of the container may be tightly covered with a lid which is made up of, e.g. an intermediate plastic resin layer sandwiched with outer and inner layers of fabrics. The Reference 2 also shows a lid which is composed of: a flat plate made of thermally insulating plastic such as olefin e.g. polyethylene and having a multiplicity of penetrating holes; a moiture-permeable thin film of silicon rubber glued on one surface of the flat plate; and a rubber packing made of e.g. vinyl chloride placed along the periphery of the flat plate and the film, thereby removing the dews deposited on the lid.

However, in cases when living farm products such as fresh fruits or vegetables are stored in a low-temperature case of Reference 1, the ethylene gas produced by the living farm products through their respiration remains in the refrigerating room and changes the gas composition therein and eventually promoting aging and degradation of the farm products.

On the other hand, in the case of the refrigerator of Reference 2, since the moiture-permeable film cannot adsorb the ethylene gas released from the vegetables, it presents the same problem as in the case of Reference 1, and in addition another problem of imbalance in the moisture in the refrigeration room. So long as the rate A of moisture coming into the refrigeration room through the lid exceeds the rate B of the moisture evaporating from the vegetables, there will be no problem. But if the rate A is less than the rate B, there will be dew drops from the lid into the refrigeration room to damage the vegetables and cause the bottom of the refrigeration room polluted with unsanitary sticky stains, further degrading the vegetables.

BRIEF SUMMARY OF THE INVENTION

In view of the problems above a major object of the invention is to provide a low-temperature case which is capable of long preserving living foods such as vegetables and fruits by indirect refrigeration of the storage room for the foods.

In order to attain this object the invention provides a low-temperature case comprising:
a thermally insulating outer box;
a thermally good conductive inner box having a ceiling wall, a bottom wall, and side walls which are arranged inside, but spaced apart from, said outer box and forming a storage room inside thereof;
a refrigeration unit having a refrigeration device and a blower in a cold-air circulation space formed between said outer and inner boxes, for indirectly refrigerating said storage room by refrigeration said inner box, and further comprising
ethylene gas adsorbing members mounted on a portion or the entire region of the outer surface of the inner box, with one surface of each members exposed to the storage room for adsorbing the ethylene generated therein and other surfaces exposed the cold-air circulation space.

In this way the ethylene gas released from the foods in the storage room may be gradually adsorbed by the gas adsorbing members mounted on at least a portion of the thermally conductive inner box and may be partially liberated into the space, thereby reducing the concentration rate of the ethylene gas in the storage room.

In this case, it is desirable to provide on the outer surface of the inner box with a heating member for heating the gas adsorbing member.

This heater, heating the surface of the gas adsorbing member, will forcibly diffuse the adsorbed gas out of the adsorbing member into the cold-air circulation space and reduce the amount of the gas adsorbed in the gas adsorbing member, thereby re-activating the adsorbing member.

It is also desirable to provide the outer box with an opening causing the cold-air circulation space to communicate with the atmosphere, and with a damper means for opening/closing the opening.

In this manner although the ethylene gas is released into the circulation space, increasing the concentration of ethylene therein, the damper means forces the ethylene-rich air to escape into the surrounding space and at the same time take in fresh air into the circulation space through the opening, thereby suppressing the ethylene gas concentration in the circulation space.

BRIEF DESCRIPTION OF THE DRAWINGS

FIG. 1 is a front view of the low-temperature storage case, showing a portion of the cold-air passage. FIG. 2 is a horizontal cross section of the low-temperature storage case taken along the upper air circulation space. FIG. 3 is an enlarged view of the portion A of FIG. 2. FIG. 4 is a vertical cross section of the low-temperature storage case.

FIG. 5 is a front view of the low-temperature storage case, showing a portion of the cold-air passage, and FIG. 6 is a horizontal cross section of the low-temperature storage case taken along the upper air circulation space.

FIG. 7 is a rear elevation of the inner box unit, and FIG. 8 is a partial cross sectional view of the inner and outer boxes.

DETAILED DESCRIPTION OF THE PREFERRED EMBODIMENT

Figure 1:
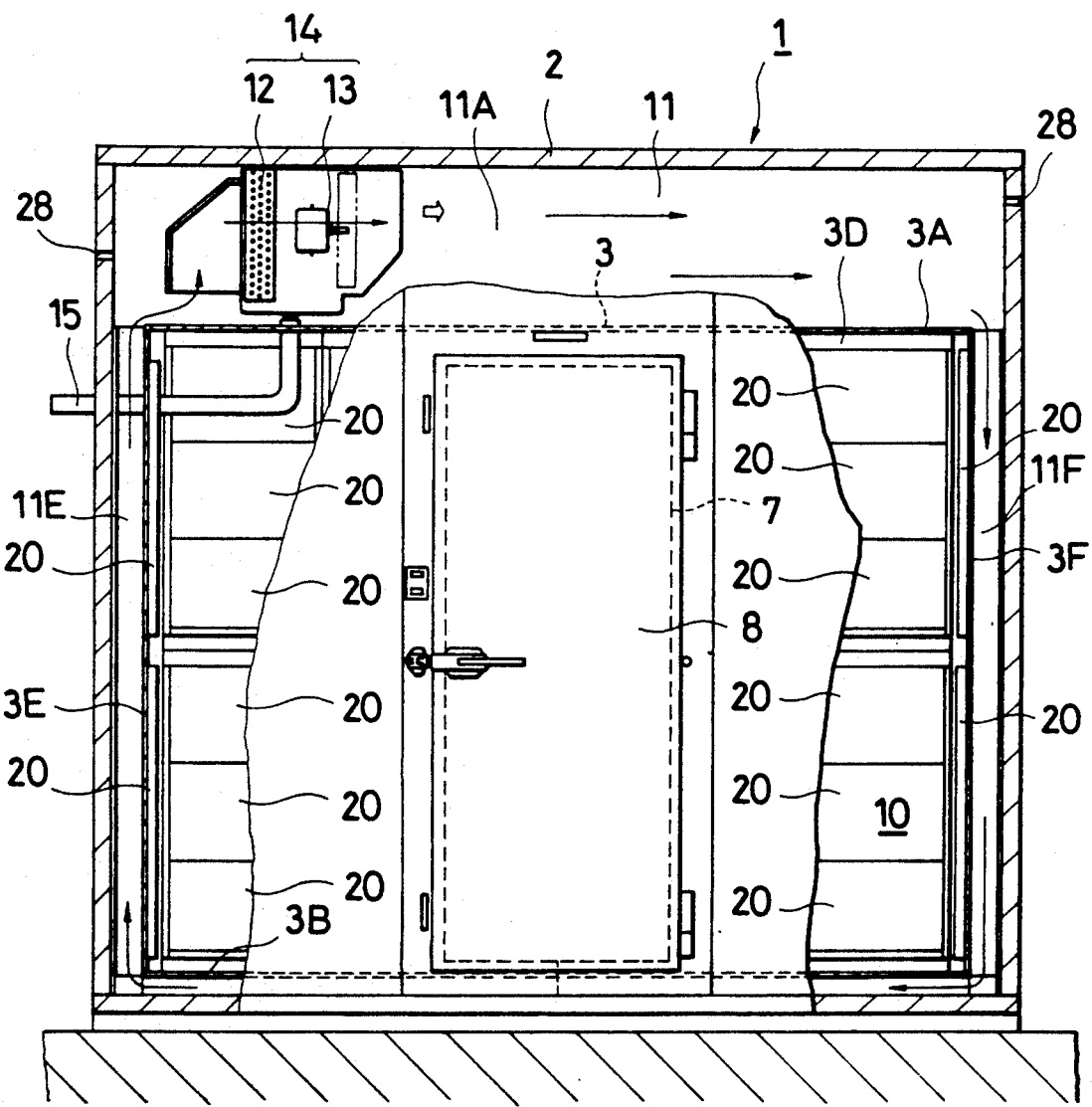
FIGS. 1 through 4 show the construction of a low-temperature storage case embodying the invention. In particular.
Figure 2:
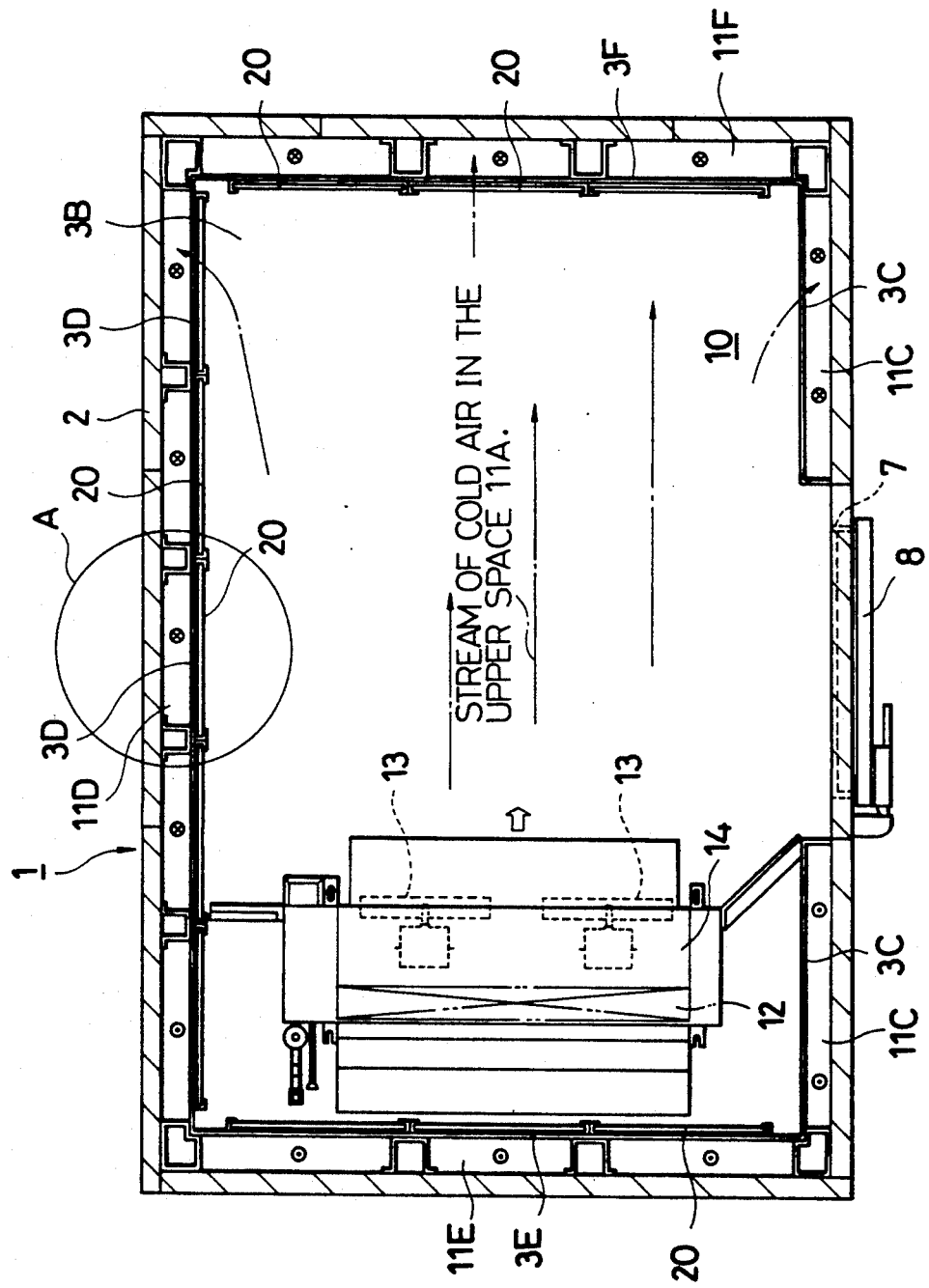
Figure 3:
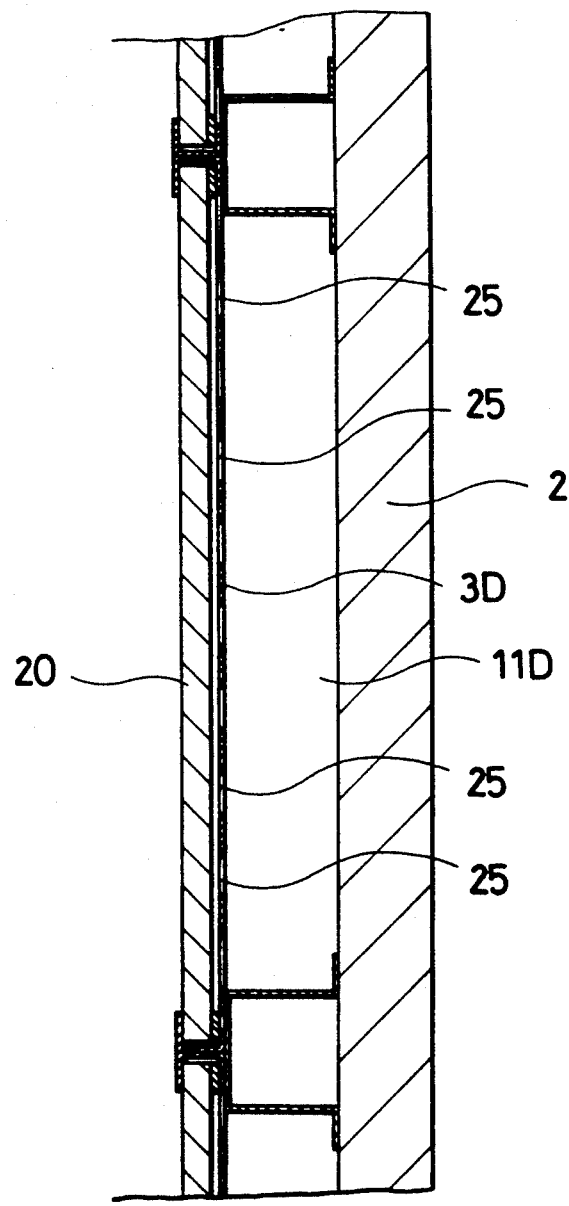
Figure 4:
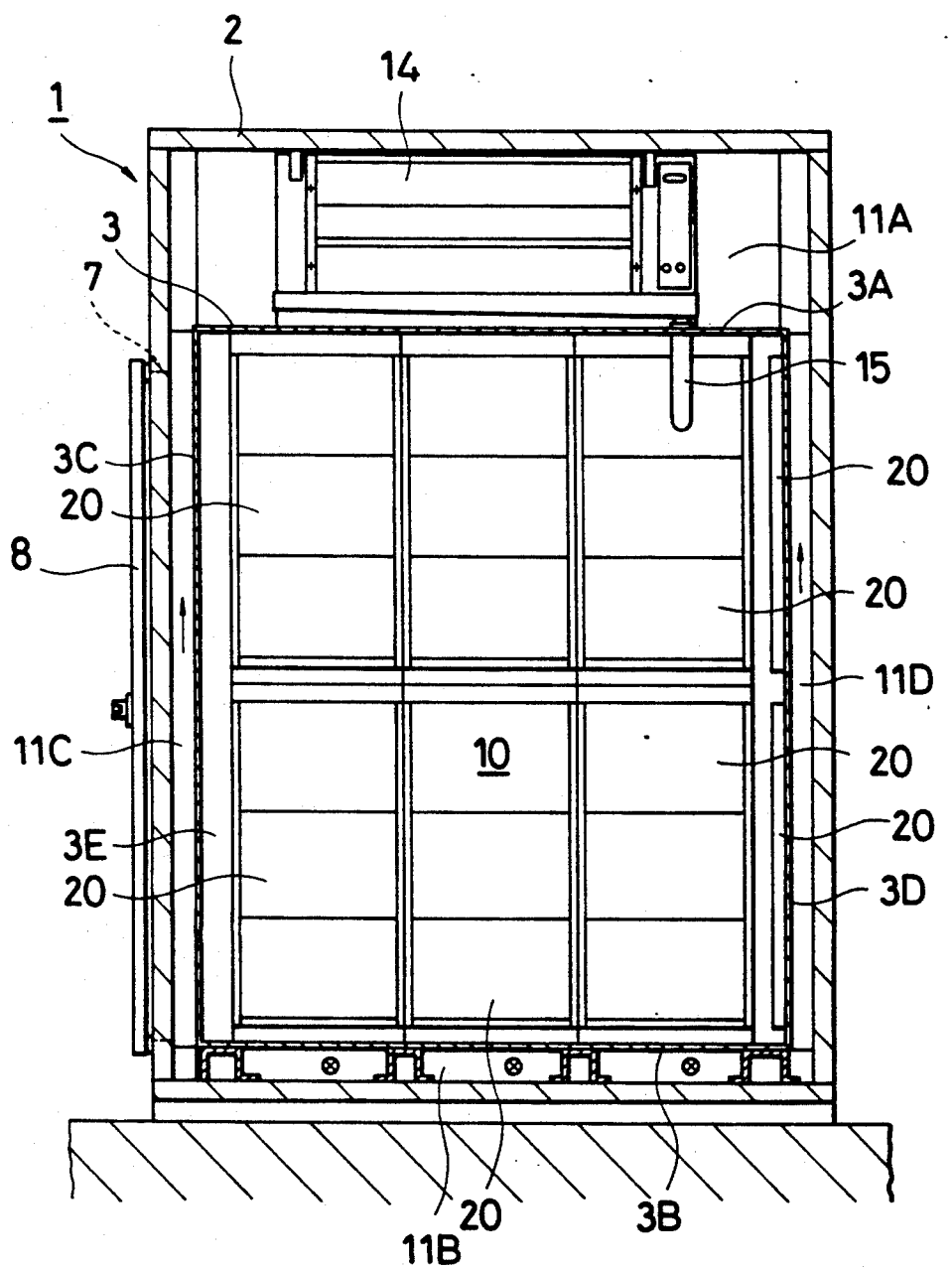

Referring to FIGS. 1 through 4, an embodiment of the invention is shown in which a low-temperature storage case 1 is a prefabricated refrigerator type low-temperature storage case, having a thermally insulating outer box 2 made up of thermally insulating panels, a thermally good conductive inner box 3 made up of metals and disposed inside, but spaced apart from, the outer box 2, the inner box comprising ceiling wall 3A and a bottom wall 3B, front, rear, and left and right side walls 3C-3F, respectively, and forming therein a closed storage room 10 and a cold-air circulation space 11 between the boxes. The outer box 2 is provided on its front wall with an opening 7 for entering farm products (such as vegetables and fruits) into the room 10 and a thermally insulating door 8 for closing the room 10.

On the outer surface of the ceiling wall 3A constituting the cold-air circulation space 11, is a refrigeration device 12 which is typically an evaporator constituting a portion of a refrigeration cycle, and is a blower unit 13 having a fan and a fan motor, altogether constituting a built-in portion of a refrigeration unit 14. At the bottom of the refrigeration unit 14 is a drain device 15 having a drain tube and a heater mounted on the tube extending to outside the outer box 2 through the ceiling wall 3A and the storing room 10. The tube is connected with, for example, a dew-receiving tray for temporarily storing dew dropping from the refrigeration device 12 during defrosting, so that the tube may drain dew collected in such tray.

It is noted that the refrigeration unit 14 used in this embodiment may operate with high accuracy in temperature control (e.g. $\pm 0.5°$ C.) in a rather small temperature range (e.g. 10° C.) about 0° C.

The cold-air circulation space 11 consists of a first upper space 11A over the ceiling wall 3A, a second bottom space 11B below the bottom wall 3B, a third front space 11C outside the front wall 3C, a fourth rear space 11D behind the rear wall 3D, a fifth left side space 11E outside the left side wall 3E, and a sixth right side space 11F outside the right side wall 3F. The built-in refrigeration unit 14 is installed in the upper space 11A of the cold-air circulation space 11. The air cooled by the refrigeration unit 14 while it passes therethrough (which air will be referred to as cold air) flows through the upper space 11A, the front and rear space 11C and 11D and the right side space 11F, into the bottom space 11B and further into the left side space 11E, and finally goes back to the upper space 11A. The cold air will then refrigerate these walls 3A through 3F and indirectly refrigerate the storage room 10. (Such refrigeration will be referred to as indirect refrigeration).

On some of the walls, for example right and left side walls and rear wall 3D-3F, respectively, are mounted gas adsorbing members 20 for adsorbing the ethylene gas released from the respiring farm products in the storage room. One surface of the gas adsorbing members 20 faces the storage room 10 and are partly exposed to the cold-air circulation space 11 through a multiplicity of holes 25 in the walls 3D-3F.

Each gas adsorbing member 20 in this example has a form of a compound board having good selective gas permeability, made of green tuff containing zeolite and polyethylene film.

Green tuff has a high permeability and adsorptibity for ethylene, and when combined with a polyethylene film which has a low permeability and adsorptibity for ethylene, may promptly remove ethylene which promotes aging of farm products, (without removing moisture necessary for the farm products).

The refrigeration process of the low-temperature storage case 1 is now described below.

After farm products or foods such as vegetables and fruits are stored in the storage room 10, the refrigeration unit 14 is started at a given preset temperature, say 2° C. The room temperature inside the storage room 10 is initially higher than the preset temperature. Cold air generated by the refrigeration unit 14 circulates from the upper space 11A of the cold-air circulation space 11 through the front, rear, and right side space 11C, 11D, and 11F, respectively, into the bottom space 11B, and then back to the refrigeration unit 14 through the left side space 11E.

During this circulation, the cold air refrigerates all of the walls 3A-3F, to thereby indirectly refrigerate the storage room by thermal conduction. As a consequence of this indirect refrigeration, the temperature of the storage room 10 will be gradually lowered below the preset temperature set by a temperature setting means (not shown), when the refrigeration unit 14 switches to a so-called thermo-off operation in which refrigerant through the refrigeration device 12 is stopped so that the room temperature of 2° C. is restored.

If the temperature of the storage room 10 becomes higher than the preset temperature due to the thermo-off operation of the refrigeration unit 14 or due to some external disturbance e.g. infiltration of the ambient air flowing into the storing room from the thermally insulating door 8 opened, the above mentioned steps are repeated to maintain the room temperature at the preset temperature.

Since the storage room 10 is closed and the air in the storage room convects in the storage room 10, and since the living farm products stored in the storage room 10 respire therein, the ethylene gas released from the farm products tends to accumulate (i.e. the concentration of the ethylene tends to gradually increase) in the room 10. On the other hand, the ethylene gas is gradually adsorbed by the gas adsorbing members 20 and released into the cold-air circulation space 11 through the holes 25. Thus, in addition to maintaining the low-temperature storage room at a constant temperature and constant humidity, the rate of accumulation of the ethylene gas in the storage room 10 is suppressed, which in turn suppresses the aging of the farm products and enabling extended preservation of the farm products compared with conventional low-temperature preservation.

Further, if small ventilation ports 28, which are small enough not raise the temperature of the cold air in circulation, is provided at some appropriate locations in the outer box, the ethylene gas accumulated in the cold-air circulation space 11 may slowly escape out of the low-temperature case 1 into the atmosphere, decreasing the concentration of the ethylene gas in the cold-air circulation space 11.

As described above, although the ethylene tends to concentrate in the storing room due to the generation by the farm products, the concentration rate of the ethylene is suppressed in the storage room because of gradual adsorption, and release into the cold-air circulation space, by the gas adsorbing members 20 mounted on the inner box. Such suppression of the ethylene in turn slows the aging of the farm products, so that the farm products may be preserved fresh for a longer period than in conventional low-temperature storage cases.

In addition to the indirect refrigeration described above which avoids blowing cold air directly onto the farm products, the storage room may be kept at a constant temperature and a high humidity since the gas adsorbing members have a low permeability for cold air and moisture, so that aging of the farm products may be greatly slowed and allowable preservation period may be extended.

Figure 5:
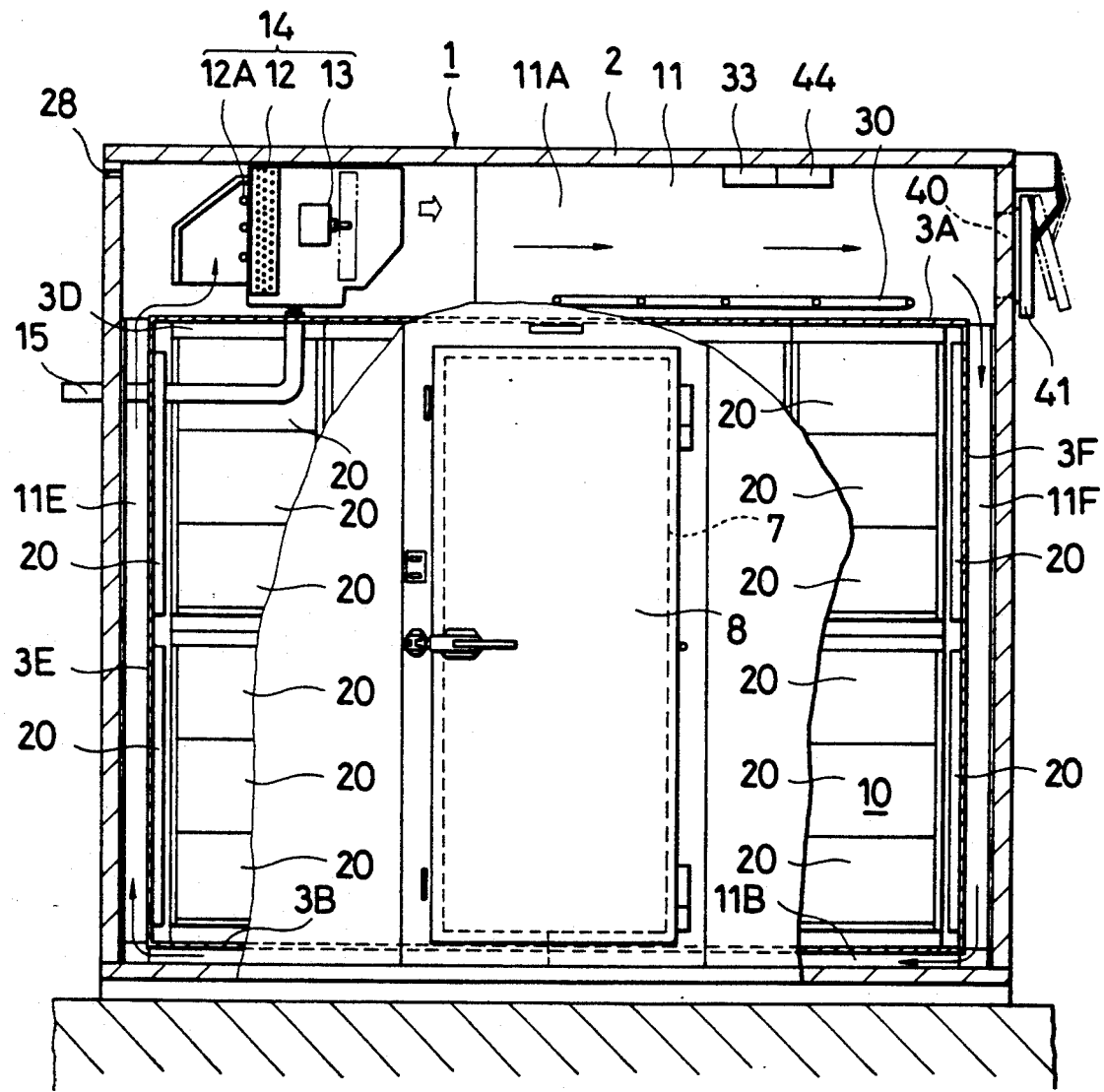
FIGS. 5 and 6 are the construction of another low-temperature storage case embodying the invention, and in particular
Figure 6:
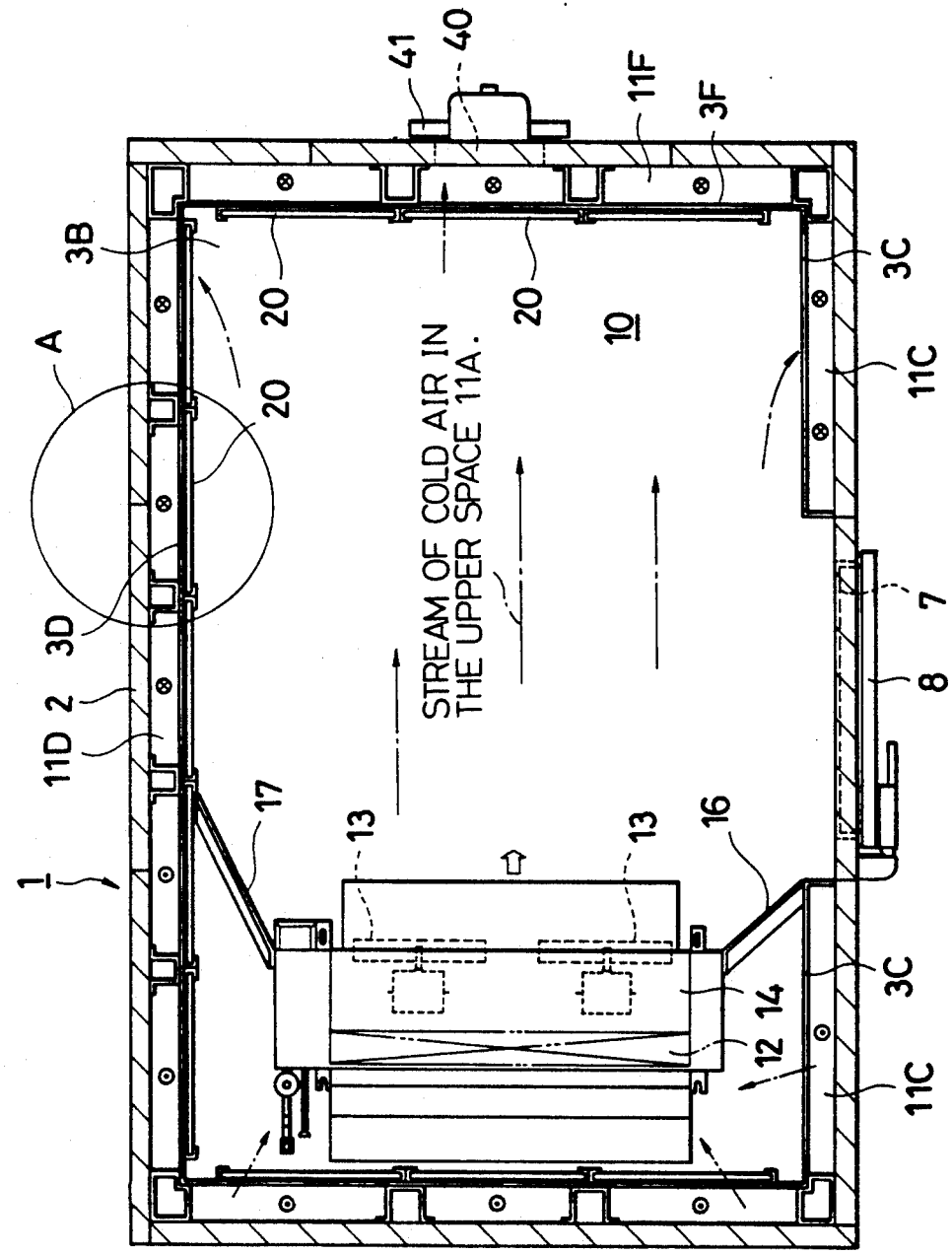

FIGS. 5 and 6 show another example embodying the invention, in which those components similar in function as in FIGS. 1 through 4 are given the same reference numbers. Major structural differences of the example shown in FIGS. 5 and 6 from that of FIGS. 1 through 4 are that the cold-air circulation space is provided with a heating device 30, an opening 40 penetrating through the thermally insulating outer box 2, and a damper means 41 for opening/closing the opening 40. The heating device 30 comprises a heater for heating the gas adsorbing members 20 to liberate the adsorbed gas adsorbed therein. The heating device 30 is placed in, for example the upper space 11A, so as to heat the surface of the gas adsorbing members 20 facing the cold-air circulation space 11. The heating device 30 is preferably controlled by a heating control means 33 for controlling heating in response to the output of a gas concentration detector and a timer so that the device 30 operates periodically before the gas adsorbing members 20 reaches its adsorption limit. Opening and closing of opening 40, provided at an appropriate position in the thermally insulating outer box 2 for refreshing the air, is periodically controlled by means of an opening/closing control means 44 in response to the output of the timer and the gas concentration detector.

Since the heating operation of the heating device 30 and opening operation of the damper means 41 cause a temperature rise in the cold-air circulation space 11, it is desirable to have a further measure to suppress the temperature rise in the storage room 10. Such a measure may be, for example (i) to have the heating device 30 and the damper means 41 operate only during non-refrigerating periods (but with blower unit 13 running), (ii) to power up the refrigeration by the unit 14 during the operations of the heating device 30 and the damper means 41, or (iii) to operate the heating device 30 and the damper means 41 only after the farm products are taken out of the storage room 10.

As an example, measure (i) above is described. When the refrigeration unit 14 is stopped because the storage room temperature has reached the preset temperature or the refrigeration unit is being defrosted, the heating device 30 is operated for a specified period of time (e.g. 10 minutes) under the control of a heater control means 33. At a given time (e.g. 5 minutes) after the beginning of the period, the damper means 41 is set in operation by the opening/closing means 44. Normal refrigeration is resumed by stopping both the heating device 30 and the damper means 41 or by stopping the former device first and the latter means later.

Given this constitution above, the low-temperature storage case functions in the same manner as the foregoing example described above. In this example, in addition to the functions pointed above, the ethylene gas adsorbed in the gas adsorbing members 20 may be easily released into the cold-air circulation space 11 and forced to flow out of the space so that the gas adsorbing members 20 may be re-activated in adsorptibity. Furthermore, because of periodic operation of the heating device 30 the gas adsorbing members 20 is periodically re-activated to suppress saturation of gas adsorption, thereby permitting very effective and very extended refrigeration operation of the low-temperature storage case 1 in preserving farm products therein.

The damper means 41 ventilates the cold-air circulation space 11, replacing the ethylene enriched air with fresh ambient air to restore the adsorptibity of the gas adsorbing members 20.

Figure 7:
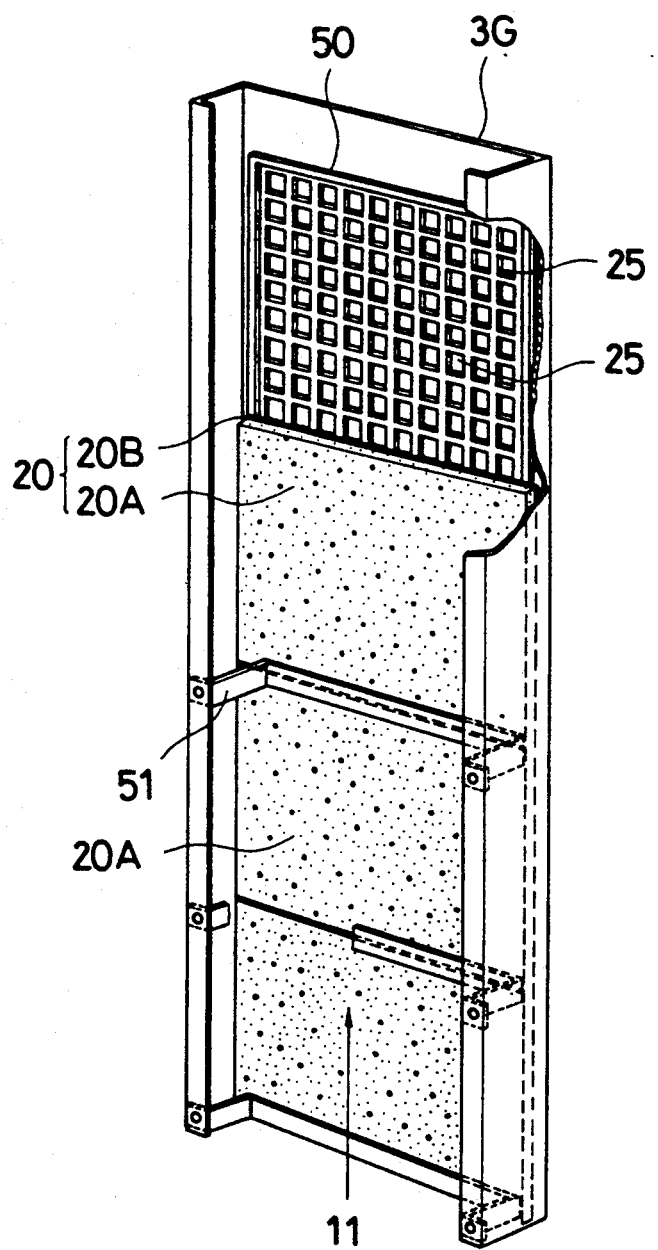
FIGS. 7 and 8 shows a particular arrangement of the gas adsorption members mounted on the inner box. More particularly.
Figure 8:
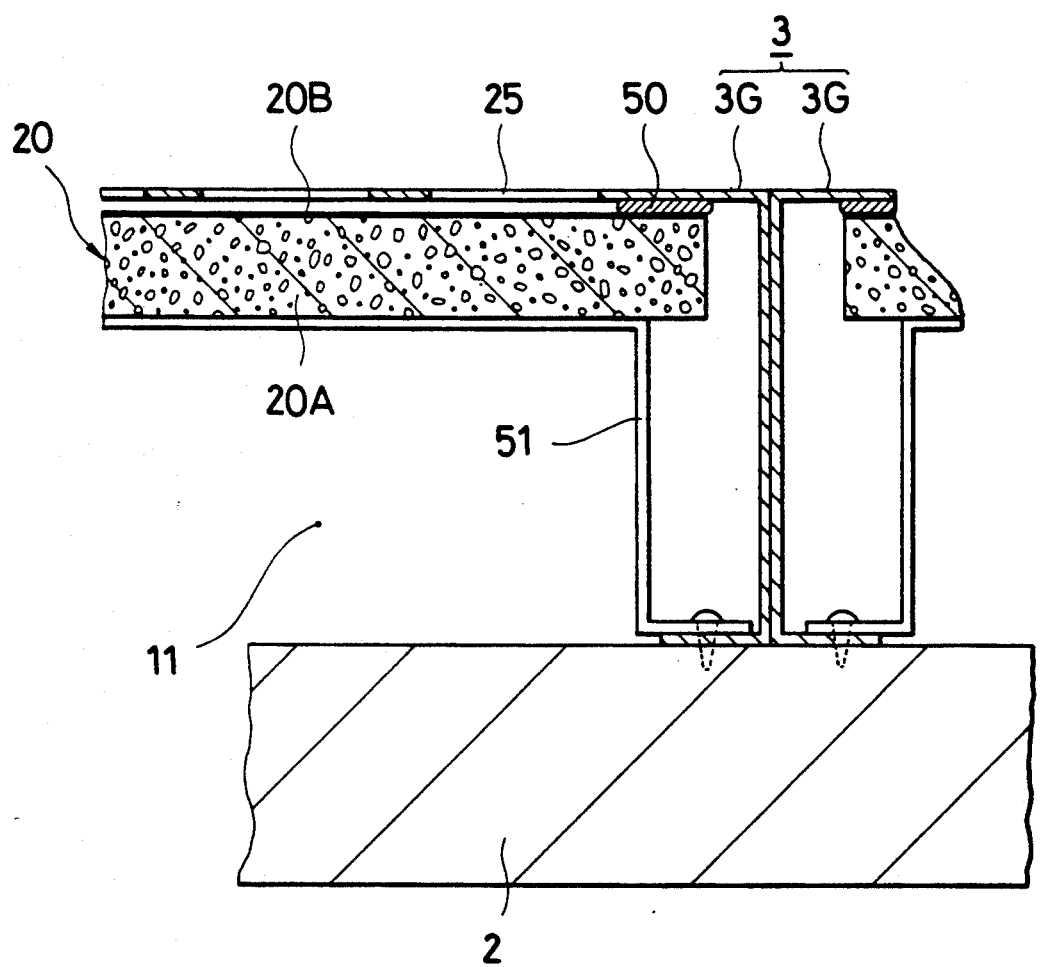

FIGS. 7 and 8 show a specific example of the gas adsorbing members 20 mounted on the inner box 3, in which FIG. 7 is a rear view of the inner box unit 3A as viewed from the cold-air circulation space 11, and FIG. 8 shows partial cross sections of the inner box 3 and the outer box 2.

As shown in these figures, the inner box 3 may be preferably mounted on the outer box 2 by mounting the opposite ends of the U-shaped corners of the adjacent inner box units 3G in hermetical contact with each other. The inner box units 3G have a lattice of holes 25. On the back of each inner box unit 3G is a seal member 50 surrounding the lattice of holes. A gas adsorbing member 20 is fixed on the inner box unit with a securing metal piece 51. The gas adsorbing member 20 is made of a panel of green tuff containing zeolite and a polyethylene film 20B covering the surface of the plate facing the storage room.

With this constitution of the inner box, the surfaces of the members 20 may be protected by the lattice-shape inner box units 3G, and leakage of the cold air and the moisture through gaps between the gas adsorbing members 20 and the lattice-shape inner box units 3G is prevented, and yet the ethylene gas in the storage room is allowed to pass through the gas adsorbing members 20 into cold-air circulation space 11. As a consequence, the ethylene gas may be removed from the storing room, while a high humidity is maintained in the storage room.

It should be understood that the gas adsorbing member 20 is not limited to a combination of polyethylene film and green tuff, and it may be of any material so long as it has good ethylene gas adsorptibity or adsorption, and good permeability.

We claim:

1. A low-temperature indirectly refrigerated storage case comprising:

a thermally insulating outer housing;

an inner housing of a thermally good conductive material arranged inside, but spaced from said outer housing and forming a storage room inside thereof;

a refrigeration unit providing cooling air in the space between said outer and inner housing, for indirectly refrigerating said storage room by refrigerating said inner housing, said inner housing having on at least one portion thereof an ethylene gas adsorbing member for adsorbing the ethylene gas released from within the storage room with one surface of said adsorbing member exposed to the storage room and another surface exposed to the space, the ethylene gas from the storage room being conveyed into said space; and a heating unit for heating said gas adsorbing member.

2. A low-temperature indirectly refrigerated storage case as in claim 1 comprising:

means for measuring the concentration of the ethylene gas in said space for controlling the operation of said heating means.

3. A low-temperature indirectly refrigerated storage case comprising:

a thermally insulating outer housing;

an inner housing of a thermally good conductive material arranged inside, but spaced from said outer housing and forming a storage room inside thereof;

a refrigeration unit providing cooling air in the space between said outer and inner housings, for indirectly refrigerating said storage room by refrigerating said inner housing, said inner housing having on at least one portion thereof an ethylene gas adsorbing member for adsorbing the ethylene gas released from within the storage room with one surface of said adsorbing member exposed to the storage room and another surface exposed to the space, the ethylene gas from the storage room being conveyed into said space; and an opening in said outer housing through which the ethylene gas in the space is vented.

4. A low-temperature storage case as in claim 3, further comprising damper means for opening/closing said opening.

5. A low-temperature storage case as in claim 3, further comprising a heating unit for heating said gas adsorbing member.

6. A low-temperature indirectly refrigerated storage case, comprising:

a thermally insulating outer housing;

an inner housing of a thermally good conductive material arranged inside, but spaced from, said outer housing and forming a storage room inside thereof;

a refrigeration unit providing cooling air in the space between said outer housing and inner housings for indirectly refrigerating said storage room by refrigerating said inner housing, said inner housing having on at least one portion thereof an ethylene gas adsorbing member for adsorbing the ethylene, with one surface of said adsorbing member exposed to the storage room and other surface exposed to the space, the surface of the gas adsorbing member facing the storage room being covered with a film of polyethelene material.

* * * * *